United States Patent
Kwon et al.

(10) Patent No.: US 8,684,410 B2
(45) Date of Patent: Apr. 1, 2014

(54) ROLL-OVER PROTECTIVE STRUCTURE FOR MULTI-PURPOSE UTILITY VEHICLE AND VEHICLE BODY HAVING THE SAME

(75) Inventors: Byoung Soo Kwon, Changnyeong-gun (KR); Jin Ho Hwang, Changnyeong-gun (KR)

(73) Assignee: Daedong Industrial Co., Ltd., Daegu (KR)

( * ) Notice: Subject to any disclaimer, the term of this patent is extended or adjusted under 35 U.S.C. 154(b) by 0 days.

(21) Appl. No.: 13/592,694

(22) Filed: Aug. 23, 2012

(65) Prior Publication Data

US 2013/0049339 A1 Feb. 28, 2013

(30) Foreign Application Priority Data

Aug. 25, 2011 (KR) .................. 10-2011-0084868

(51) Int. Cl.
*B60R 21/13* (2006.01)

(52) U.S. Cl.
USPC ........................................................ 280/756

(58) Field of Classification Search
USPC ............... 280/756, 781, 785; 296/203.1, 205
See application file for complete search history.

(56) References Cited

U.S. PATENT DOCUMENTS

| 8,414,082 B2 * | 4/2013 | Nakamura et al. | .......... 298/17 R |
|---|---|---|---|
| 2012/0056411 A1 * | 3/2012 | Nakamura et al. | ............ 280/756 |

FOREIGN PATENT DOCUMENTS

| JP | 01022679 A * | 1/1989 | ............. B62D 21/18 |
|---|---|---|---|
| JP | 2006-103370 A | 4/2006 | |
| KR | 10-0534505 B1 | 12/2005 | |
| KR | 20-2010-0012842 U | 12/2010 | |
| KR | 20-2011-0002087 U | 3/2011 | |

OTHER PUBLICATIONS

Korean Office Action for Korean Patent Application No. 10-2011-0084868.
Korean Office Action for Korean Patent Application No. 10-2011-0084868, Oct. 2011.

* cited by examiner

*Primary Examiner* — Faye M. Fleming
(74) *Attorney, Agent, or Firm* — LRK Patent Law Firm

(57) ABSTRACT

A roll-over protective structure includes a left side frame assembly including two vertical members, which are spaced in a vehicle length direction and have a width that allows a passenger to get in or out of the vehicle, and a connecting member which connects upper ends of the vertical members to each other, a right side frame assembly which has the same configuration as the left side frame assembly and is spaced a predetermined distance from the left side frame assembly in a vehicle width direction, a plurality of link members which connect the left side frame assembly and the right side frame assembly to each other, and a cross member which connects lower ends of the left and right vertical members, which are located at the rear side of the vehicle, to each other among the plurality of vertical members.

10 Claims, 9 Drawing Sheets

ROLL-OVER PROTECTIVE STRUCTURE FOR MULTI-PURPOSE UTILITY VEHICLE AND VEHICLE BODY HAVING THE SAME

CROSS-REFERENCE TO RELATED PATENT APPLICATION

This application claims the benefit of Korean Patent Application No. 10-2011-0084868, filed on Aug. 25, 2011, in the Korean Intellectual Property Office, the disclosure of which is incorporated herein in its entirety by reference.

BACKGROUND OF THE INVENTION

1. Field of the Invention

The present invention relates to a roll-over protective structure (ROPS) for a multi-purpose utility vehicle and a vehicle body having the same and, more particularly, to a roll-over protective structure which is attached to the top of a multi-purpose utility vehicle, which has a wide range of uses, for the safety of passengers and a vehicle body having the same.

2. Description of the Related Art

Recently, multi-purpose utility vehicles have been widely used in a variety of fields such as distribution, construction, leisure, agriculture, etc. In particular, the multi-purpose utility vehicle is designed for rough road running and thus is mainly used as a carrying vehicle for carrying soil or agricultural products in an agricultural field or carrying tools required for various works in a construction site.

As such, the multi-purpose utility vehicle, which is mainly used in the construction site or agricultural field, often operates on a natural ground or an a steep grade. Accordingly, a passenger may be often injured by falling rock or rollover of the vehicle. In preparation for this, a roll-over protective structure (ROPS) is attached to the top of the vehicle.

When the ROPS has sufficient structural rigidity so as not to be bent against falling rock and has a structure that can minimize its deformation due to the weight of the vehicle body during vehicle rollover, the safety of passengers can be improved. In the case of a conventional multi-purpose utility vehicle, a frame extends from a vehicle frame to form a ROPS having a substantially hexahedral shape that can protect the driver's seat.

That is, the commonly known conventional multi-purpose utility vehicle has a structure in which the ROPS, a structure for protecting passengers, is integrally formed with the vehicle frame. Accordingly, if the ROPS needs to be separated, the ROPS cannot be separated from the vehicle frame when the multi-purpose utility vehicle is parked or stored in a limited space or during maintenance in a confined space, which thus needs space as large as its volume.

In addition, although the ROPS has a structure that is separable from the vehicle frame, the structural rigidity of the ROPS must be reduced compared to the above-mentioned integrated ROPS and, as a result, the ROPS cannot perform its role of protecting the passengers from the danger properly, thus reducing the safety and reliability of the multi-purpose utility vehicle.

SUMMARY OF THE INVENTION

The present invention has been made in an effort to solve the above-described problems associated with prior art, and an object of the present invention is to provide a roll-over protective structure (ROPS; for a multi-purpose utility vehicle and a vehicle body having the same, which have a structure in which the ROPS can be easily assembled to and disassembled from a vehicle frame, if necessary, thus facilitating the assembly and disassembly of the ROPS.

Another object of the present invention is to provide a roll-over protective structure (ROPS) for a multi-purpose utility vehicle and a vehicle body having the same, which can improve the structural rigidity while allowing the ROPS to be disassembled from a vehicle frame, thus improving the safety and reliability of the multi-purpose utility vehicle.

According to an aspect of the present invention to achieve the above object of the present invention, there is provided a roll-over protective structure for a multi-purpose utility vehicle, the roll-over protective structure comprising: a left side frame assembly including two vertical members, which are spaced in a vehicle length direction and have a width that allows a passenger to get in or out of the vehicle, and a connecting member which connects upper ends of the vertical members to each other; a right side frame assembly which has the same configuration as the left side frame assembly and is spaced a predetermined distance from the left side frame assembly in a vehicle width direction; a plurality of link members which connect the left side frame assembly and the right side frame assembly to each other; and a cross member which connects lower ends of the left and right vertical members, which are located at the rear side of the vehicle, to each other among the plurality of vertical members.

The two vertical members and the one connecting, which constitute each of the left side frame assembly and the right side frame assembly, may be connected to each other in such a manner that a tubular fastening member formed on each of both ends of the connecting member is put on a tubular assembly member formed on an upper end of each vertical member in a covering manner and then a bolting member is fastened to a matching bolting hole.

The link members may comprise: two upper link members which connect the upper ends of the two vertical members of the left side frame assembly and the upper ends of the two vertical members of the right side frame assembly to each other; and a lower link member which connects the centers of the left and right vertical members, which are located at the rear side of the vehicle, to each other.

The roll-over protective structure may further comprise a sub-member which vertically connects the upper link member, which is located at the rear side of the vehicle, among the two upper link members, and the lower link member to each other to increase the structural rigidity of the roll-over protective structure.

The sub-member may be an integrated steel pipe bent into a U-shape.

Both ends of the cross member may be integrally connected to the lower ends of the left and right vertical members, which are located at the rear side of the vehicle, by welding.

The cross member may comprise a plurality of belt brackets which are attached and fixed to the cross member to install a seat belt.

The roll-over protective structure may further comprise a guide member which is attached to each of the left and right vertical members at the rear side of the vehicle in a position spaced upward from the cross member.

According to another aspect of the present invention to achieve the above object of the present invention, there is provided a vehicle body for a multi-purpose utility vehicle, the vehicle body comprising: the above-described roll-over protective structure; and a vehicle frame on which the roll-over protective structure is mounted and supported.

The vehicle frame may comprise: a base frame which forms a bottom portion; a front suspension frame which is disposed at a front end of the base frame to mitigate impact from the front of the vehicle; a dashboard frame which is connected to a rear end of the front suspension frame and on which a dashboard is mounted; a rear suspension frame which is disposed at a rear end of the base frame to mitigate impact from the rear of the vehicle; and a seat frame which is disposed in the center of the base frame to create a space for mounting an engine and to provide a surface for installing seats.

The vehicle body may further comprise a connecting bracket, which is bent into a shape that is closely fitted to the outer surface of the dashboard frame and is formed at each of lower ends of left and right vertical members, which are located at the front side of the vehicle, among a plurality of vertical members which constitute the roll-over protective structure, and a bolting hole which is formed on one side of each of the connecting bracket and the dashboard frame, with which the connecting bracket is in close contact, in a position to match each other during assembly such that, in a state where the connecting bracket is temporarily assembled to the dashboard frame such that the bolting holes coincide with each other, the left and right vertical members at the front side and the dashboard frame are connected to each other using a bolting member.

The dashboard frame may have a trapezoidal shape in which its width increases downwardly, and the width at the lower end of the trapezoidal dashboard frame may be greater than the width between the left and right vertical members at the front side such that, during assembly in the vertical direction, the connecting brackets at the lower ends of the left and right vertical members are caught by both sides of the dashboard frame to be closely fixed to the dashboard frame, and then the left and right vertical members and the dashboard frame are assembled to each other.

The seat frame may comprise two support members which provide a surface on which the cross member of the roll-over protective structure is placed and are disposed in the vehicle width direction, and the support members and the cross member, which is placed on the support members, may comprise bolting holes, which are formed at regular intervals and coincide with each other, such that the support members and the cross member are detachably connected to each other by means of bolting members.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings. In describing the present invention, well-known functions or constructions will not be described in detail since they may unnecessarily obscure the understanding of the present invention.

Figure 1:
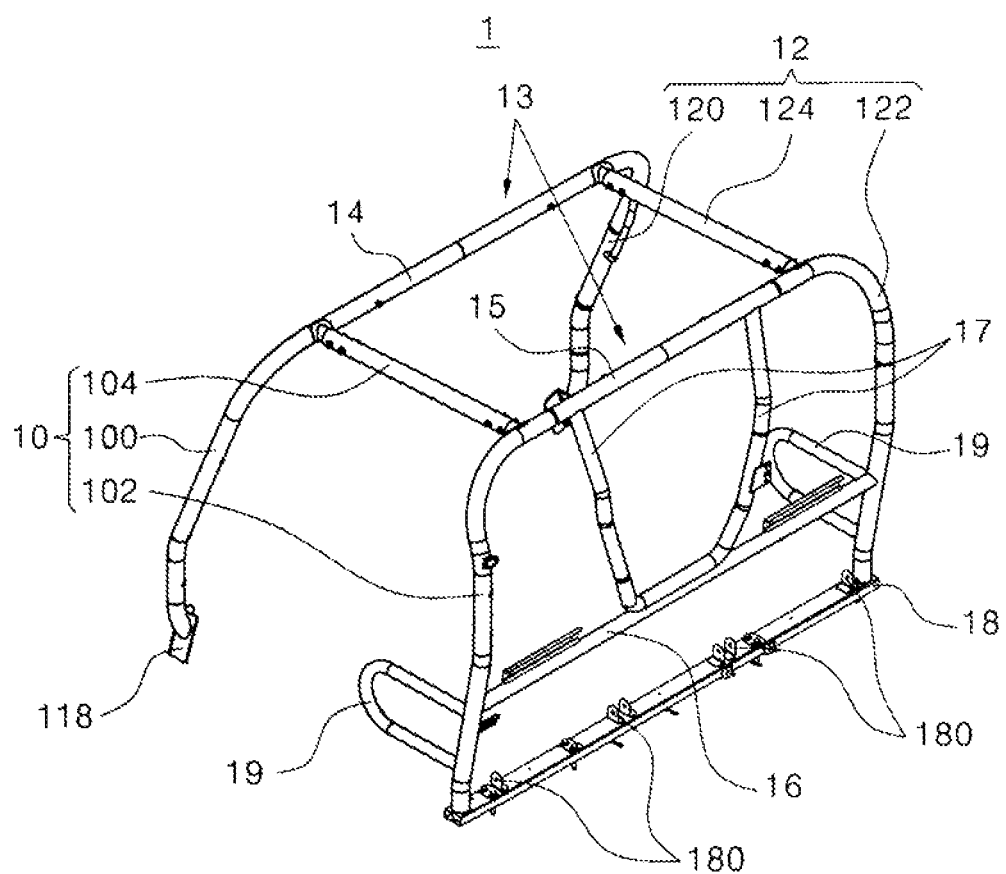
FIG. 1 is a perspective view of a roll-over protective structure (ROPS) for a multi-purpose utility vehicle in accordance with an aspect of the present invention.
Figure 2:
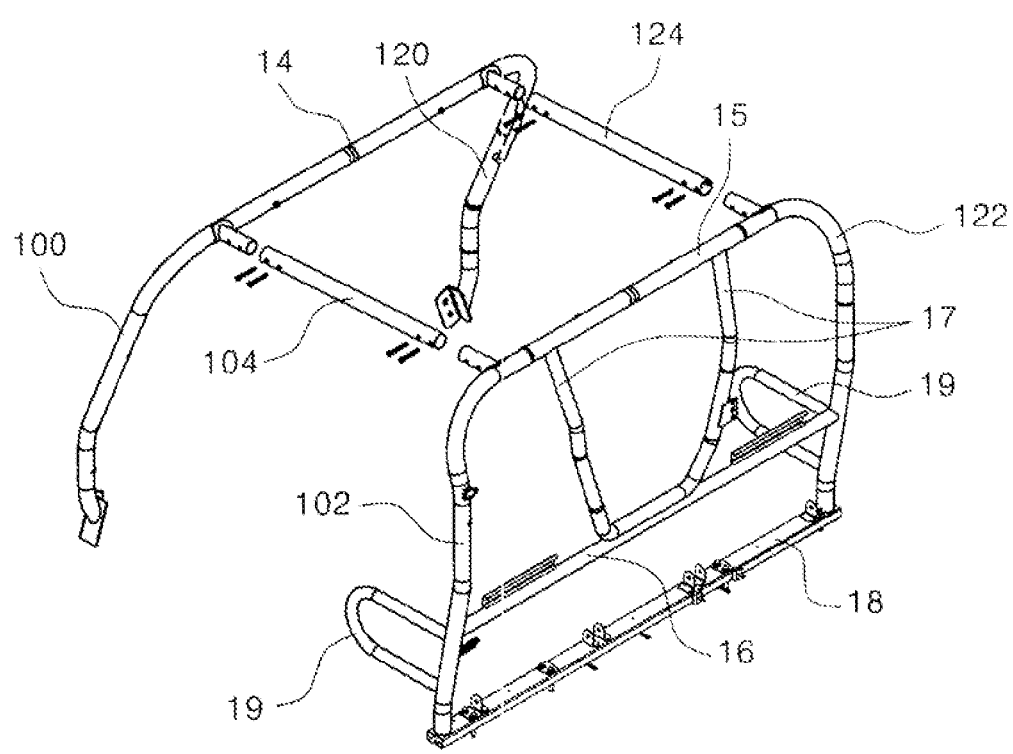
FIG. 2 is an exploded perspective view of the ROPS shown in FIG. 1.
Figure 3:
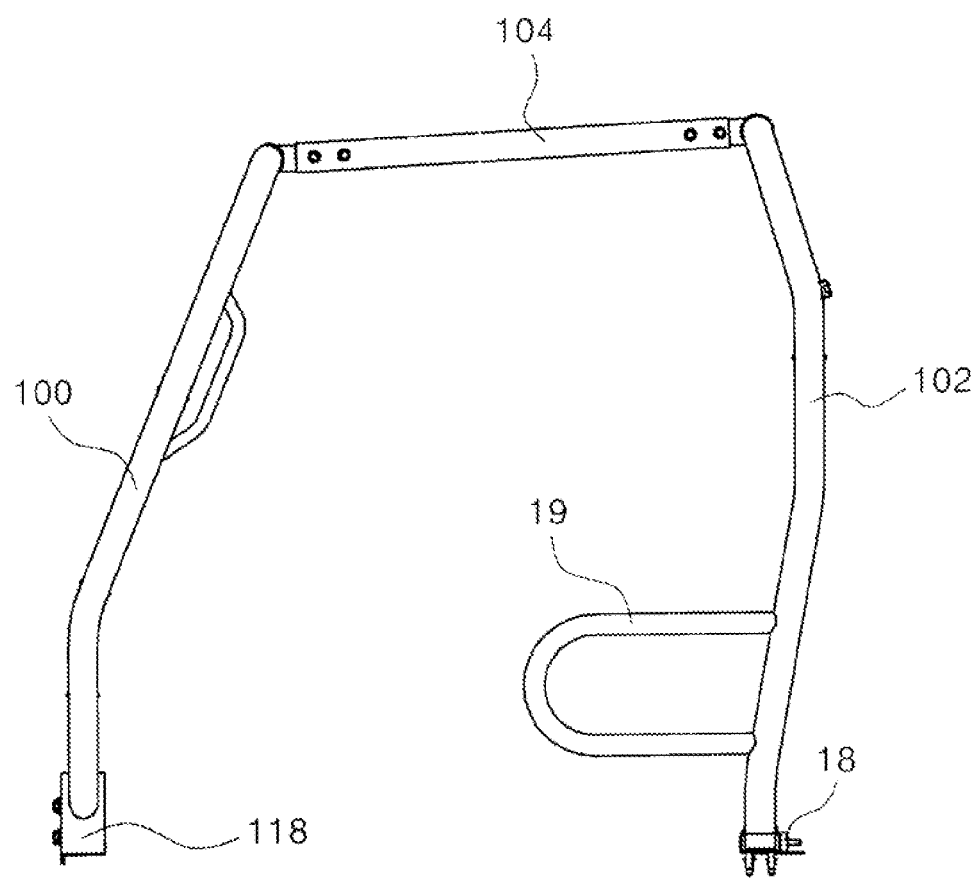
FIG. 3 is a side view of the ROPS shown in FIG. 1.
Figure 4:
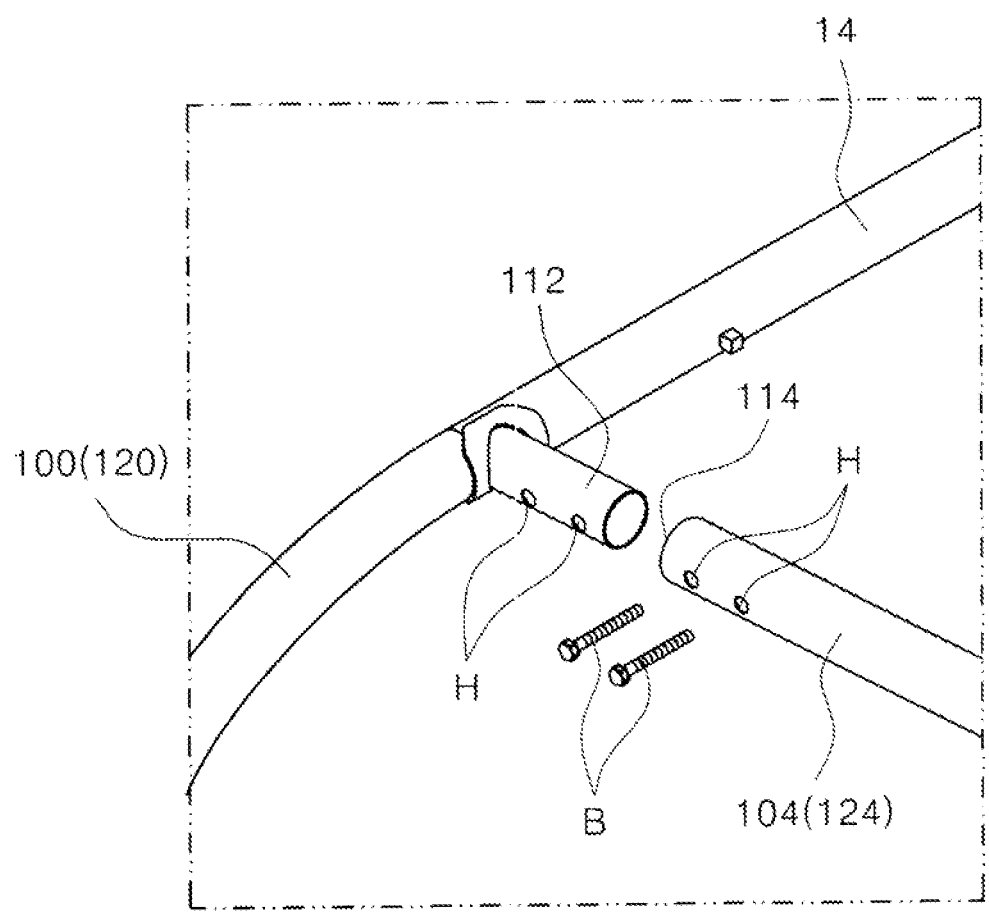
FIGS. 4 and 5 are exploded perspective views showing a connecting structure between two vertical members and a connecting member, which constitute each of left and right side frame assemblies of the ROPS, in accordance with an aspect of the present invention.
Figure 5:
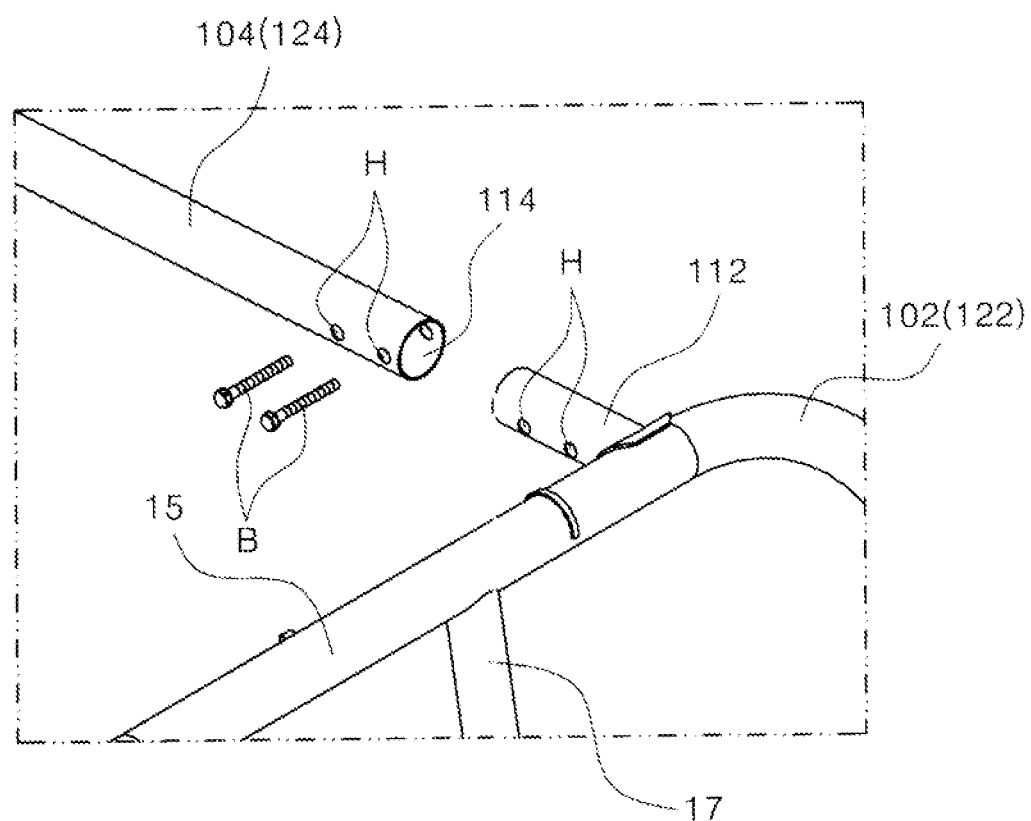

Roll-Over Protective Structure (ROPS) in Accordance with an Aspect of the Present Invention FIG. 1 is a perspective view of a roll-over protective structure (ROPS) for a multi-purpose utility vehicle in accordance with an aspect of the present invention, and FIG. 2 is an exploded perspective view of the ROPS shown in FIG. 1, FIG. 3 is a side view of the ROPS shown in FIG. 1, and FIGS. 4 and 5 are exploded perspective views showing a connecting structure between two vertical members and a connecting member, which constitute each of left and right side frame assemblies of the ROPS, in accordance with an aspect of the present invention.

Referring to FIGS. 1 to 5, a roll-over protective structure (ROPS) 1 for a multi-purpose utility vehicle in accordance with an aspect of the present invention comprises two left and right side frame assemblies 10 and 12 which are spaced in a vehicle width direction, a plurality of link members 13 which connect these left and right side frame assemblies 10 and 12 to each other, and a cross member 18 which is provided for reinforcement.

The left side frame assembly 10 and the right side frame assembly 12 have the same configuration. In detail, each of the left side frame assembly 10 and the right side frame assembly 12 comprises a front side vertical member 100 or 120 and a rear side vertical member 102 or 122, which are spaced in a vehicle length direction and have a width that allows a passenger to get in or out of the vehicle, and a connecting member 104 or 124 which connects upper ends of the two vertical members 100 or 120 and 102 or 122 to each other, which are arranged forward and backward in the vehicle length direction.

The two vertical members 100 or 120 and 102 or 122 and the one connecting member 104 or 124, which constitute the left side frame assembly 10 or the right side frame assembly 12, may be connected to each other in such a manner that a tubular fastening member 114 formed on each of both ends of the connecting member 104 or 124 is put on a tubular assembly member 112 formed on an upper end of each vertical member 100 or 120 in a covering manner and then a bolting member B is fastened to a matching bolting hole H as shown in FIGS. 4 and 5.

The link members 13, which connect the left and right side frame assemblies 10 and 12 to each other, comprise two upper link members 14 and 15, which connect the upper ends of the two vertical members 100 and 102 of the left side frame assembly 10 and the upper ends of the two vertical members 120 and 122 of the right side frame assembly 12 to each other, and a lower link member 16 which connects the centers of the left and right vertical members 102 and 122 to each other, which are located at the rear side of the vehicle.

A sub-member 17 may be disposed between the upper link member 15, which is located at the rear side of the vehicle between two upper link members 14 and 15, and the lower link member 16 to connect them to each other. The sub-member 17 vertically connects the upper link member 15 and the lower link member 16 to each other to increase the vertical structural rigidity of the ROPS 1 in accordance with the present embodiment. To this end, the sub-member 17 may be an integrated steel pipe bent into a U-shape.

The cross-member 18 connects lower ends of the left and right vertical members 102 and 122, which are located at the rear side of the vehicle, to each other among the above-described plurality of vertical members. In detail, both ends of the cross member 18 are integrally connected to the lower ends of the left and right vertical members 102 and 122, which are located at the rear side of the vehicle, to each other by welding to further enhance the rigidity of the ROPS 1 and to also enhance the rigidity of a vehicle frame 2 during connection to the vehicle frame 2.

Figure 6:
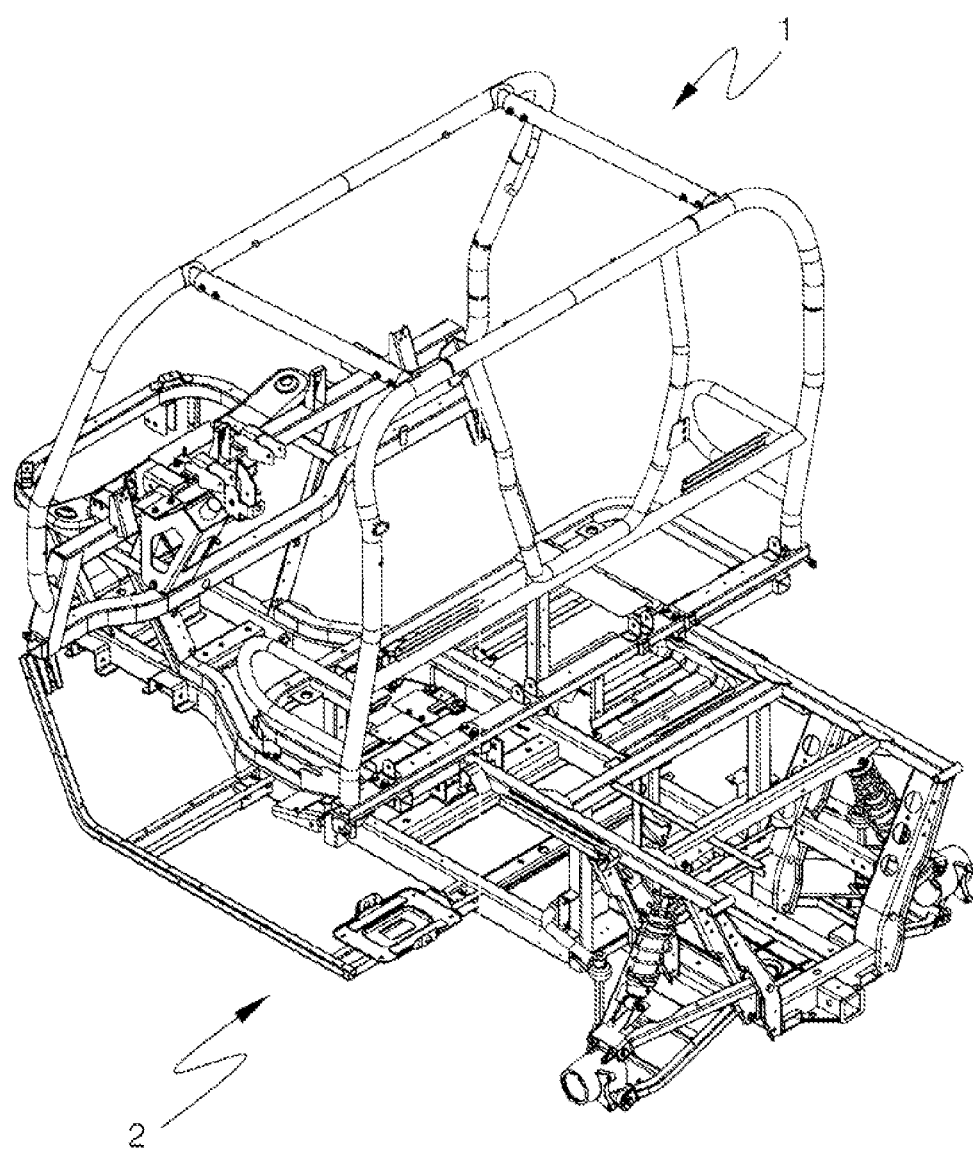
FIG. 6 is a perspective view of a vehicle body for a multi-purpose utility vehicle in accordance with another aspect of the present invention showing that the ROPS of FIGS. 1 to 5 is mounted on a vehicle frame.
Figure 7:
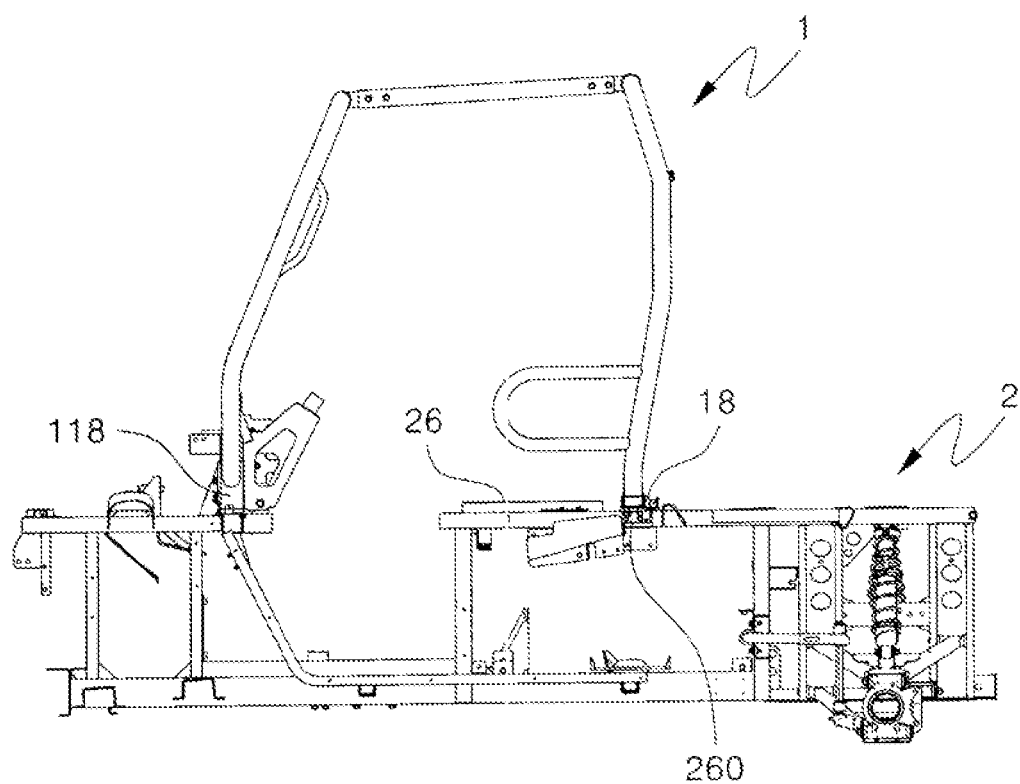
FIG. 7 is an assembled side view in accordance with another aspect of the present invention shown in FIG. 6.
Figure 8:
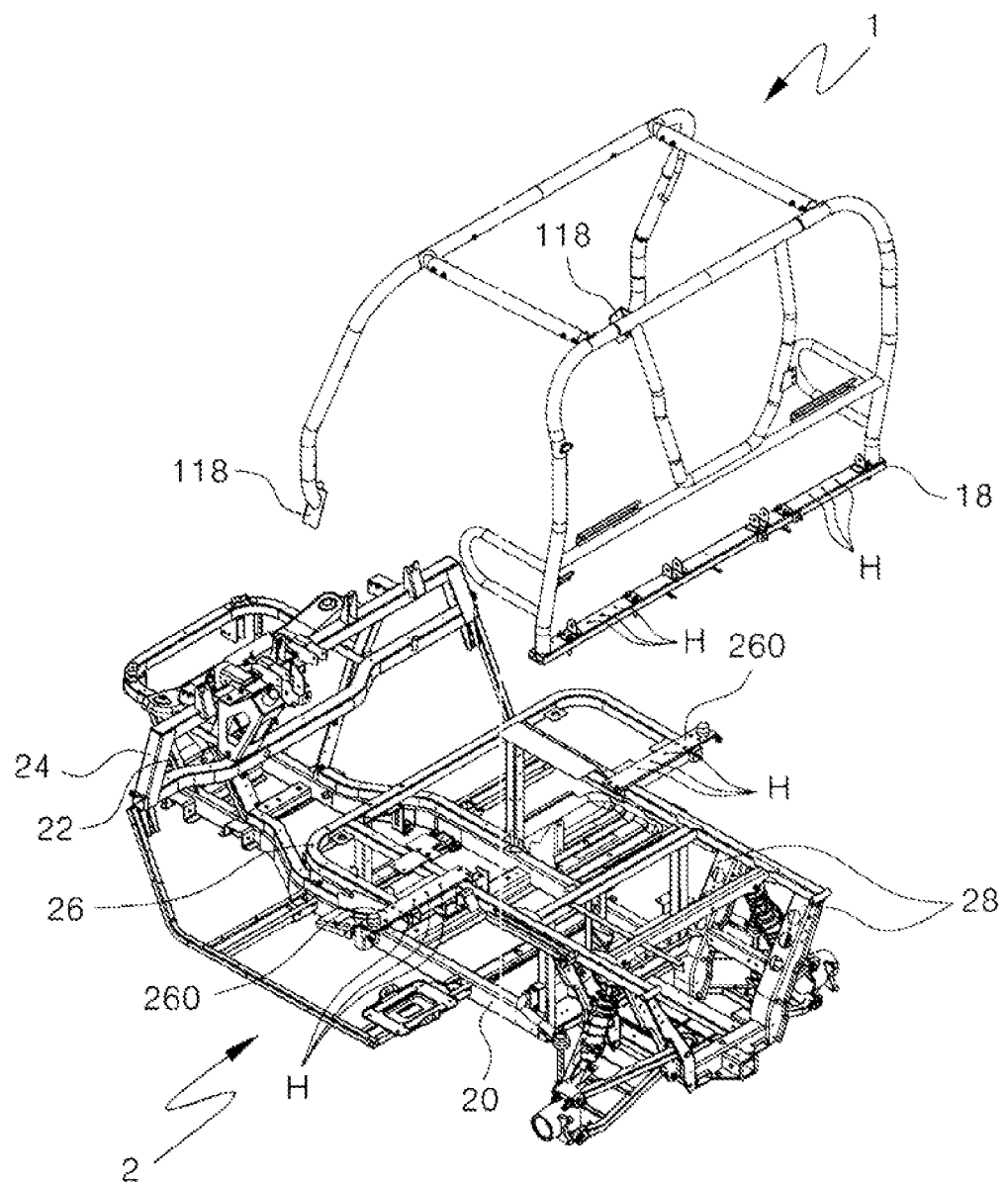
FIG. 8 is an exploded perspective view in accordance with another aspect of the present invention showing that the ROPS is disassembled from the vehicle frame.

During connection to the vehicle frame 2, the cross member 18 is placed on a seat frame 26 of the vehicle frame 2 and, in particular, located in a position where it is structurally advantageous to install a seat belt as shown in FIGS. 6 to 8. Thus, a plurality of belt brackets 180 for the installation of the seat belt may be attached and fixed to the cross member 18 at regular intervals, and a plurality of bolting holes H for connection to the vehicle frame 2, in detail, to the seat frame 26, which will be described in detail later, may be formed at regular intervals.

In FIGS. 1 to 3, reference numeral 19 refers to a guide member for protecting a passenger in a compartment defined by the above-described ROPS from being thrown from the vehicle by centrifugal force or impact during operation of the vehicle. The guide member 19 may be attached to each of the left and right vertical members 102 and 122 at the rear side of the vehicle in a position spaced upward from the cross member 18. The guide member 19 may preferably have a "C" shape as shown in the figures. However, the shape of the guide member 19 is not limited thereto but may have various shapes.

Vehicle Body Having the ROPS for the Multi-Purpose Utility Vehicle in Accordance with Another Aspect of the Present Invention Next, the configuration of a vehicle body having the above-described ROPS for the multi-purpose utility vehicle in accordance with another aspect of the present invention will be described.

Figure 9:
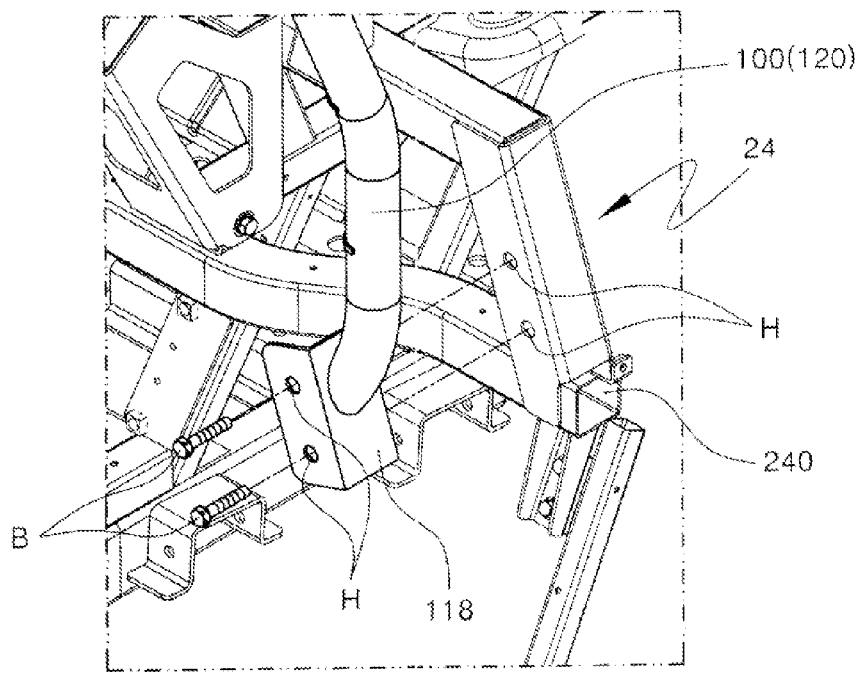
FIG. 9 is a perspective view showing a connecting structure between a vertical member at the front side of the vehicle, among a plurality of vertical members which constitute the ROPS, and a vehicle frame.
Figure 10:
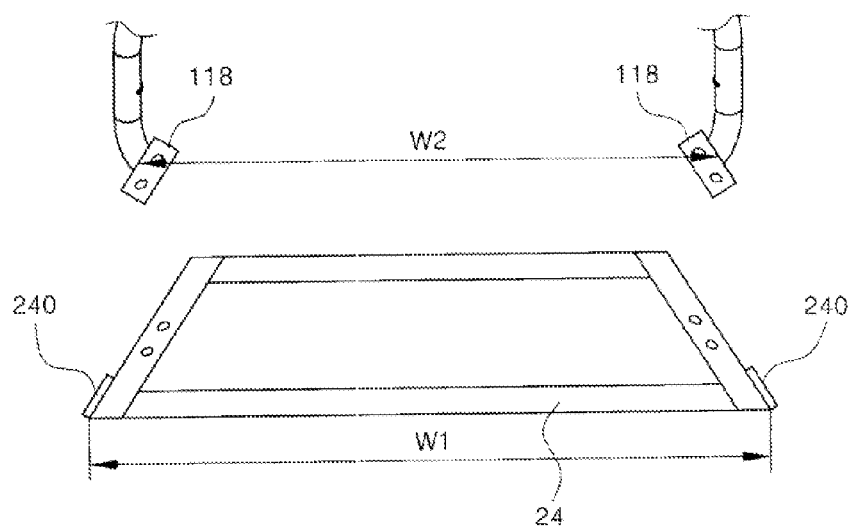
FIG. 10 is a view showing the relationship between the width of left and right vertical members at the front side of the vehicle, which constitute the ROPS, and the width of a dashboard frame.

FIG. 6 is a perspective view of a vehicle body for a multi-purpose utility vehicle in accordance with another aspect of the present invention showing that the ROPS on a vehicle frame and FIG. 7 is an assembled side view in accordance with another aspect of the present invention shown in FIG. 6. FIG. 8 is an exploded perspective view in accordance with another aspect of the present invention showing that the ROPS is disassembled from the vehicle frame, and FIG. 9 is an enlarged perspective view showing the principal part of FIG. 8. Moreover, FIG. 10 is a view showing the relationship between the width of left and right vertical members at the front side of the vehicle, which constitute the ROPS, aid the width of a dashboard frame.

Referring to FIGS. 6 to 10, a vehicle body for a multi-purpose utility vehicle in accordance with another aspect of the present invention comprises a roll-over protective structure (ROPS) 1 and a vehicle frame 2 on which the ROPS 1 is detachably mounted. In the present embodiment, the ROPS 1 is the same as the above-described ROPS 1 in accordance with an aspect of the present invention. Thus, a repeated description thereof will be omitted, and the vehicle frame 2 and the connection relationship between the vehicle frame 2 and the ROPS 1 will be described.

The vehicle frame 2 comprises a base frame 20 which forms a bottom portion, a front suspension frame 22 which is disposed at a front end of the base frame 20 to mitigate impact from the front of the vehicle, a dashboard frame 24 which is connected to a rear end of the front suspension frame 22 and on which a dashboard is mounted, a rear suspension frame 28 which is disposed at a rear end of the base frame 20 to mitigate impact from the rear of the vehicle, and a seat frame 26 which is disposed in the center of the base frame 20 to create a space for mounting an engine and to provide a surface for installing seats.

A connecting bracket 118, which is bent into a shape that is closely fitted to the outer surface of the dashboard frame 24, is formed at each of lower ends of left and right vertical members 100 and 120, which are located at the front side of the vehicle, among a plurality of vertical members which constitute the ROPS 1. Moreover, a bolting hole H is formed on one side of each of the connecting bracket 118 and the dashboard frame 24, with which the connecting bracket 118 is in close contact, in a position to match each other during assembly.

Accordingly, as shown in FIG. 9, the connecting bracket 118 is located on the outer surface of the dashboard frame 24 such that the bolting holes H coincide with each other, and the two members are fastened using a bolting member B such as a bolt. As a result, the two left and right vertical members 100 and 120 at the front side are detachably connected to the dashboard frame 24.

The dashboard frame 24 has a trapezoidal shape in which its width increases downwardly. Width W1 at the lower end of the trapezoidal dashboard frame 24 is greater than width W2 between the left and right vertical members at the front side (see FIG. 10). Accordingly, during assembly in the vertical direction, the connecting brackets 118 at the lower ends of the left and right vertical members 100 and 120 are caught by both sides of the dashboard frame 24 to be closely fixed to the dashboard frame 24, and then the left and right vertical members 100 and 120 and the dashboard frame 24 are connected to each other by the bolting member B.

The seat frame 26 comprises two support members 260 which provide a surface on which the cross member 18 of the ROPS 1 is placed and are disposed in the vehicle width direction. Bolting holes H, which coincide with each other during assembly, are formed at regular intervals in the support members 260 and the cross member 18, which is placed on the support members 260. Thus, the cross member 18 can be detachably connected to the support members 260 by means of bolting members B.

In the figures, reference numeral 240 refers to a stopper which prevents the connecting bracket 118 from sliding downwards when the connecting bracket 118 is connected to the dashboard frame 24.

As described above, according to the above-described roll-over protective structure (ROPS) for the multi-purpose utility vehicle in accordance with the embodiment of the present invention, the ROPS can be assembled to and disassembled from the vehicle frame. Thus, when the multi-purpose utility vehicle is parked or stored in a limited space or during maintenance in a confined space, the ROPS can be separated from the vehicle frame if necessary, and thus it is possible to reduce the space and facilitate the maintenance.

Moreover, the overall rigidity of the ROPS in accordance with the embodiment of the present invention can be improved by the sub-members, the cross member, etc. even while the ROPS can be disassembled from the vehicle frame. That is, the ROPS can be disassembled from the vehicle frame, and further its structural rigidity can be improved, thus improving the overall safety and reliability of the multi-purpose utility vehicle.

The foregoing detailed description of the present invention has been described with respect to particular embodiments. However, it should be understood that the present invention is not limited to such particular embodiments set forth in the detailed description, but that the present invention includes all modifications, equivalents, and alternatives which fall within the spirit and scope of the present invention defined by the appended claims.

What is claimed is:

1. A vehicle body for a multi-purpose utility vehicle, the vehicle body comprising:
    a roll-over protective structure; and
    a vehicle frame on which the roll-over protective structure is mounted and supported,
    wherein the roll-over protective structure comprises:
    a left side frame assembly including two vertical members, which are spaced in a vehicle length direction and have a width that allows a passenger to get in or out of the vehicle, and a connecting member which connects upper ends of the vertical members to each other;
    a right side frame assembly which has the same configuration as the left side frame assembly and is spaced a predetermined distance from the left side frame assembly in a vehicle width direction;
    a plurality of link members which connect the left side frame assembly and the right side frame assembly to each other; and
    a cross member which connects lower ends of the left and right vertical members, which are located at the rear side of the vehicle, to each other among the plurality of vertical members,
    wherein the vehicle frame comprises:
    a base frame which forms a bottom portion;
    a front suspension frame which is disposed at a front end of the base frame to mitigate impact from the front of the vehicle;
    a dashboard frame which is connected to a rear end of the front suspension frame and on which a dashboard is mounted;
    a rear suspension frame which is disposed at a rear end of the base frame to mitigate impact from the rear of the vehicle; and
    a seat frame which is disposed in the center of the base frame to create a space for mounting an engine and to provide a surface for installing seats, and
    wherein the seat frame comprises two support members embers which provide a surface on which the cross member of the roll-over protective structure is placed and are disposed in the vehicle width direction, and the support members and the cross member, which is placed on the support members, comprise bolting holes, which are formed at regular intervals and coincide with each other such that the support members and the cross member are detachably connected to each other by means of bolting members.

2. The vehicle body of claim 1, wherein the two vertical members and the one connecting member, which constitute each of the left side frame assembly and the right side frame assembly, are connected to each other in such a manner that a tubular fastening member formed on each of both ends of the connecting member is put on a tubular assembly member formed on an upper end of each vertical member in a covering manner and then a bolting member is fastened to a matching bolting hole.

3. The vehicle body of claim 1, wherein the link members comprise:
    two upper link members which connect the upper ends of the two vertical members of the left side frame assembly and the upper ends of the two vertical members of the right side frame assembly to each other; and
    a lower link member which connects the centers of the left and right vertical members, which are located at the rear side of the vehicle, to each other.

4. The vehicle body of claim 3, wherein the roll-over protective structure further comprises a sub-member which vertically connects the upper link member, which is located at the rear side of the vehicle, among the two upper link members, and the lower link member to each other to increase the structural rigidity of the roll-over protective structure.

5. The vehicle body of claim 4, wherein the sub-member is an integrated steel pipe bent into a U-shape.

6. The vehicle body of claim 1, wherein both ends of the cross member are integrally connected to the lower ends of the left and right vertical members, which are located at the rear side of the vehicle, by welding.

7. The vehicle body of claim 6, wherein the cross member comprises a plurality of belt brackets which are attached and fixed to the cross member to install a seat belt.

8. The vehicle body of claim 7, wherein the roll-over protective structure further comprises a guide member which is attached to each of the left and right vertical members at the rear side of the vehicle in a position spaced upward from the cross member.

9. The vehicle body of claim 1, further comprising a connecting bracket, which is bent into a shape that is closely fitted to the outer surface of the dashboard frame and is formed at each of lower ends of left and right vertical members, which are located at the front side of the vehicle, among a plurality of vertical members which constitute the roll-over protective structure, and a bolting hole which is formed on one side of each of the connecting bracket and the dashboard frame, with which the connecting bracket is in close contact, in a position to match each other during assembly such that, in a state where the connecting bracket is temporarily assembled to the dashboard frame such that the bolting holes coincide with each other, the left and right vertical members at the front side and the dashboard frame are connected to each other using a bolting member.

10. The vehicle body of claim 9, wherein the dashboard frame has a trapezoidal shape in which its width increases downwardly, and the width at the lower end of the trapezoidal dashboard frame is greater than the width between the left and right vertical members at the front side such that, during assembly in the vertical direction, the connecting brackets at the lower ends of the left and right vertical members are caught by both sides of the dashboard frame to be closely fixed to the dashboard frame, and then the left and right vertical members and the dashboard frame are assembled to each other.

* * * * *